US012699605B2

(12) United States Patent
Yang et al.

(10) Patent No.: US 12,699,605 B2
(45) Date of Patent: Aug. 4, 2026

(54) CONCEPT FOR PROVIDING ACCESS TO OFFLOADING CIRCUITRY

(71) Applicant: Intel Corporation, Santa Clara, CA (US)

(72) Inventors: Ziye Yang, Shanghai (CN); Paul Luse, Chandler, AZ (US); James Harris, Chandler, AZ (US); Benjamin Walker, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 255 days.

(21) Appl. No.: 18/568,328

(22) PCT Filed: Nov. 25, 2021

(86) PCT No.: PCT/CN2021/133040
§ 371 (c)(1),
(2) Date: Dec. 8, 2023

(87) PCT Pub. No.: WO2023/092371
PCT Pub. Date: Jun. 1, 2023

(65) Prior Publication Data
US 2024/0296083 A1 Sep. 5, 2024

(51) Int. Cl.
*G06F 9/54* (2006.01)
(52) U.S. Cl.
CPC .................................... *G06F 9/545* (2013.01)
(58) Field of Classification Search
CPC ... G06F 9/545; G06F 9/4411; G06F 2209/509
See application file for complete search history.

(56) References Cited

U.S. PATENT DOCUMENTS 10,698,842 B1 * 6/2020 Dastidar ............... G06F 13/122
12,210,877 B2 * 1/2025 Dubeyko ........... G06F 9/30181
(Continued)

FOREIGN PATENT DOCUMENTS

CN 101770389 A 7/2010
EP 3835957 A1 6/2021

OTHER PUBLICATIONS

Wang Liang-Min et al, "Build an SR-IOV Hypervisor", 2019 IFIP/IEEE Symposium On Integrated Network and Service Management (IM), IFIP, Apr. 8, 2019 (Apr. 8, 2019), pp. 539-544, XP033552074, [retrieved on May 16, 2019], * the whole document *.

*Primary Examiner* — Edward J Dudek, Jr.
(74) *Attorney, Agent, or Firm* — SPL Patent Attorneys PartG mbB; Yong Beom Hwang

(57) ABSTRACT

Examples relate to an apparatus, device, method, and computer program for providing access to offloading circuitry of a computer system, to a method and computer program for setting up access to offloading circuitry of a computer system, and to corresponding computer systems. The apparatus comprises circuitry configured to provide a common interface for accessing offloading circuitry of the computer system from one or more software applications. The circuitry is configured to select one of a kernel-space driver and a user-space driver for accessing the offloading circuitry. The circuitry is configured to provide the access to the offloading circuitry for the one or more software applications via the selected driver at runtime.

20 Claims, 5 Drawing Sheets

(56)     References Cited

U.S. PATENT DOCUMENTS

| | | | |
|---|---|---|---|
| 2005/0246443 A1 | 11/2005 | Yao et al. | |
| 2016/0266946 A1* | 9/2016 | Adda | G06F 11/0715 |
| 2016/0328562 A1* | 11/2016 | Saxena | G06F 21/566 |
| 2019/0050273 A1* | 2/2019 | Tamir | G06F 9/4411 |
| 2021/0149587 A1 | 5/2021 | Lukoshkov et al. | |
| 2022/0103629 A1* | 3/2022 | Cherian | G06F 3/067 |
| 2023/0102374 A1* | 3/2023 | Zhu | H04L 9/12 |
| | | | 726/26 |

* cited by examiner

PROVIDING A COMMON INTERFACE — 110

OBTAINING AN INSTRUCTION RELATED TO SELECTION OF DRIVER — 120

SELECTING A DRIVER — 130

CONFIGURING ACCESS TO THE OFFLOADING CIRCUITRY — 140

PROVIDING ACCESS TO THE OFFLOADING CIRCUITRY — 150

TRANSLATING INSTRUCTIONS — 155

SELECTING A DRIVER — 130

CONFIGURING ACCESS TO THE OFFLOADING CIRCUITRY — 140

PROVIDING ACCESS TO THE OFFLOADING CIRCUITRY — 150

| Usage | Kernel driver | User space driver |
|---|---|---|
| DSA device register and PCI bar space access | System call | Direct memory access via memory mapped I/O through VFIO |
| DSA WQ and group configuration | System call | Direct memory access via memory mapped I/O through VFIO |
| Different I/O requests resource management | No difference while using kernel or user space driver. It is uniformly managed in the user space | |
| I/O request submission | Dedicated mode: Leverage movdir64b function to operate on the register of the WQ provided by the kernel with the hw descriptor.<br><br>Shared mode: Use enqcmd on the registers of the WQ provided by the kernel with the hw descriptor. | Leverage movdir64b function to operate on the WQ register with the dod hw descriptor (Only dedicated mode is supported now) |

Fig. 3

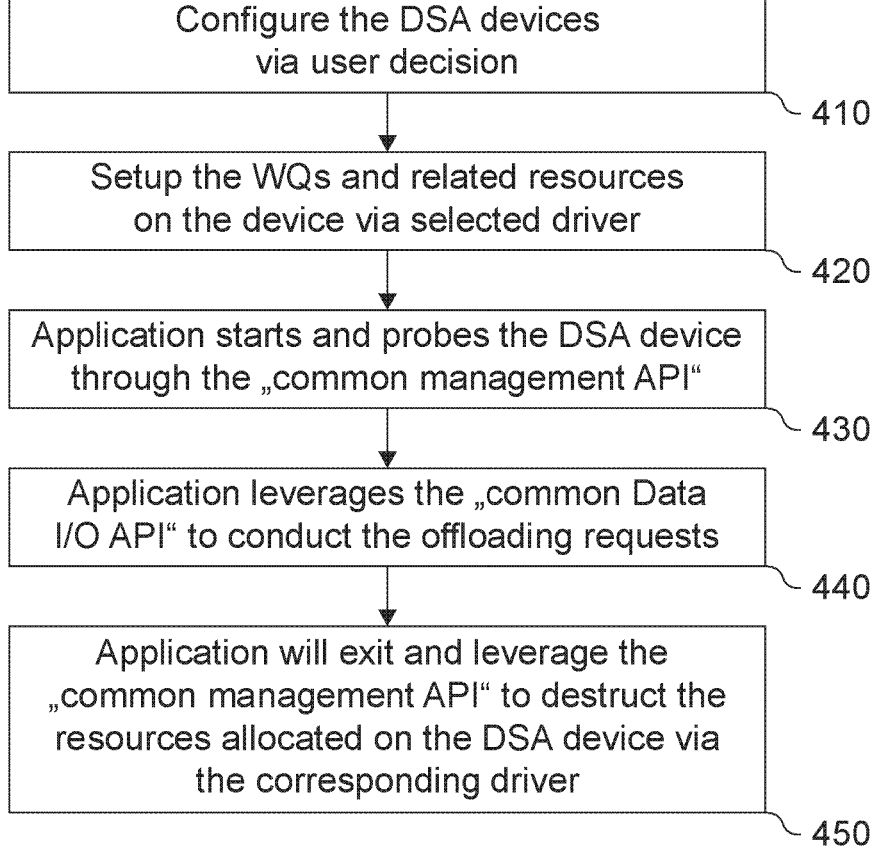

Configure the DSA devices
via user decision

410

Setup the WQs and related resources
on the device via selected driver

420

Application starts and probes the DSA device
through the „common management API"

430

Application leverages the „common Data
I/O API" to conduct the offloading requests

440

Application will exit and leverage the
„common management API" to destruct the
resources allocated on the DSA device via
the corresponding driver

CONCEPT FOR PROVIDING ACCESS TO OFFLOADING CIRCUITRY

BACKGROUND

Many hardware-based CPU (Central Processing Unit) offloading devices can be driven by kernel (i.e., kernel space) drivers or user space drivers. However, the two kinds of drivers generally cannot be uniformly used in one software stack due to differences in usage models, so that limitations in software make the CPU offloading device difficult to use from applications. In the following, an example is given with respect to a Data Streaming Accelerator (DSA) developed by Intel®. However, the same limitations apply to any offloading device.

To access offloading devices such as the DSA, two different driver implementations may be used (in the following denoted DOD for Data Offloading Driver). One is the kernel implementation and the other is a user space implementation. For example, the kernel implementation may be implemented for relatively recent Linux kernels or other operating systems (e.g., Microsoft Windows). The user space implementation is not implemented in a given kernel but can be implemented through user space drivers (e.g., provided by the Storage Performance Development Kit, SPDK) via VFIO (Virtual Function Input/Output) or UIO (Userspace Input/Output) in Linux.

Users may want to leverage DSA when running software on both less recent Linux kernels and more recent Linux kernels. In less recent Linux kernels, DSA drivers might not be available in the Linux kernel. So, a user space driver-based solution is required. Otherwise, the related driver would have to be backported from the more recent kernel to the less recent kernel version, which is often infeasible or impractical.

However, user space drivers may not be suitable to all usage scenarios. For example, user space drivers may not support scenarios in which many different applications would like to share the DSA device, as the DSA devices might only be managed by one process (called the primary process). If other processes (including VMs/containers) would like to share utilization of the DSA devices, then an IPC (Inter Process Communication)-related mechanism may be used between the other process and the primary process, which may not scale well.

Moreover, container deployment might not be privileged for direct DSA device access through a user space driver. Therefore, a kernel driver may have a particular benefit to cloud native usage scenarios. Additionally, the kernel driver may create working queues (WQs) with a shared mode, so the kernel can provision working queues to different applications and share the device. In conclusion, kernel-based drivers can be more useful in some scenarios.

BRIEF DESCRIPTION OF THE FIGURES

Some examples of apparatuses and/or methods will be described in the following by way of example only, and with reference to the accompanying figures, in which

FIG. 3 shows an example of a table illustrating a difference in resource management and access with different drivers; and FIG. 4 shows an example of a typical usage flow of an application.

DETAILED DESCRIPTION

Figure 1A:
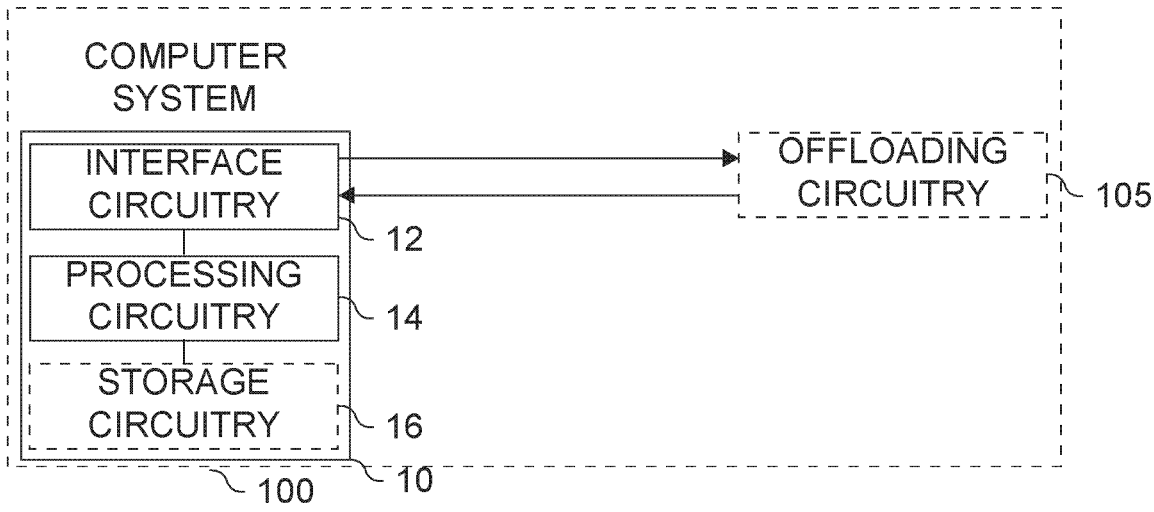
FIG. 1a shows a block diagram of an example of an apparatus or device for a computer system, and of a computer system comprising such an apparatus or device.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

In the following description, specific details are set forth, but examples of the technologies described herein may be practiced without these specific details. Well-known circuits, structures, and techniques have not been shown in detail to avoid obscuring an understanding of this description. "An example/example," "various examples/examples," "some examples/examples," and the like may include features, structures, or characteristics, but not every example necessarily includes the particular features, structures, or characteristics.

Some examples may have some, all, or none of the features described for other examples. "First," "second," "third," and the like describe a common element and indicate different instances of like elements being referred to. Such adjectives do not imply element item so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact.

As used herein, the terms "operating", "executing", or "running" as they pertain to software or firmware in relation to a system, device, platform, or resource are used interchangeably and can refer to software or firmware stored in one or more computer-readable storage media accessible by the system, device, platform, or resource, even though the instructions contained in the software or firmware are not actively being executed by the system, device, platform, or resource.

The description may use the phrases "in an example/ example," "in examples/examples," "in some examples/ examples," and/or "in various examples/examples," each of which may refer to one or more of the same or different examples. Furthermore, the terms "comprising," "including," "having," and the like, as used with respect to examples of the present disclosure, are synonymous.

FIG. 1a shows a block diagram of an example of an apparatus 10 or device 10 for a computer system 100, and of a computer system 100 comprising such an apparatus 10 or device 10. The apparatus 10 comprises circuitry that is configured to provide the functionality of the apparatus 10. For example, the apparatus 10 comprises interface circuitry 12, processing circuitry 14 and (optional) storage circuitry 16. For example, the processing circuitry 14 may be coupled with the interface circuitry 12 and with the storage circuitry 16. For example, the processing circuitry 14 may be configured to provide the functionality of the apparatus, in conjunction with the interface circuitry 12 (for exchanging information, e.g., with an application and/or offloading circuitry 105 of the computer system 100) and the storage circuitry (for storing information) 16. Likewise, the device 10 may comprise means that is/are configured to provide the functionality of the device 10. The components of the device 10 are defined as component means, which may correspond to, or implemented by, the respective structural components of the apparatus 10. For example, the device 10 comprises means for processing 14, which may correspond to or be implemented by the processing circuitry 14, means for communicating 12, which may correspond to or be implemented by the interface circuitry 12, and (optional) means for storing information 16, which may correspond to or be implemented by the storage circuitry 16.

The circuitry or means, e.g., the processing circuitry 14 or means for processing 14, is configured to provide a common interface for accessing the offloading circuitry 105 of the computer system from one or more software applications (being executed on the computer system). The circuitry or means, e.g., the processing circuitry 14 or means for processing 14, is configured to select one of a kernel-space driver (or kernel driver) and a user-space driver for accessing the offloading circuitry. The circuitry or means, e.g., the processing circuitry 14 or means for processing 14, is configured to provide the access to the offloading circuitry for the one or more software applications via the selected driver at runtime.

FIG. 1a further shows the computer system 100 comprising the apparatus 10 and the offloading circuitry 105. For example, the computer system may be a personal computer system, such as a desktop computer or laptop computer, or a server computer system. In particular, the computer system may be a workstation computer system or a server computer system for use in a server farm. In some examples, the computer systems may be mobile computer systems, such as smartphones or tablet computers.

Figure 1B:
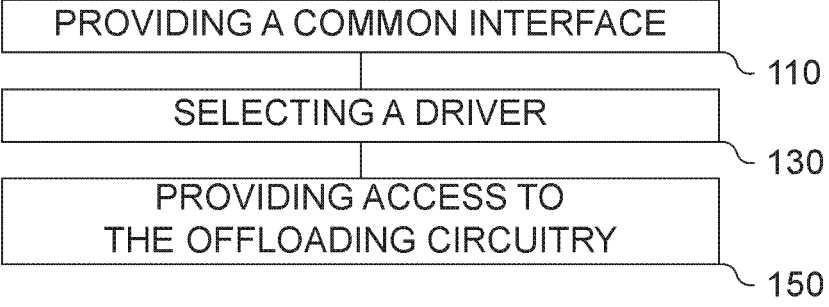
FIGS. 1b and 1c show flow charts of examples of a method for a computer system.
Figures 1C, 1D:
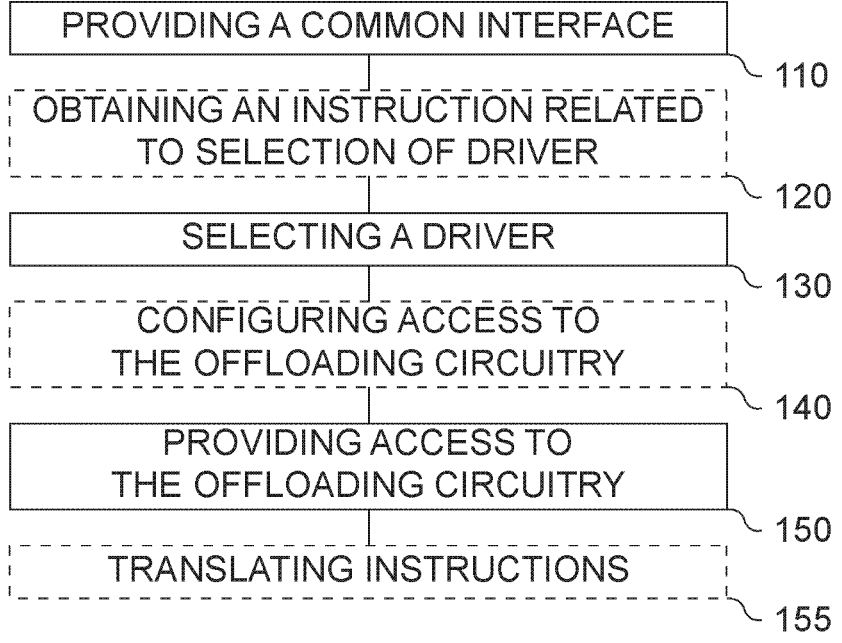
FIG. 1d shows a flow chart of an example of a method for setting up access to offloading circuitry in a computer system.

FIGS. 1b and 1c show flow charts of examples of a corresponding method for a computer system. For example, the method may be performed by the computer system 100 introduced in connection with FIG. 1a, e.g., by the circuitry or means of the apparatus 10 or device. The method comprises providing 110 a common interface for accessing offloading circuitry 105 of the computer system from one or more software applications. The method comprises selecting 130 one of a kernel-space driver and a user-space driver for accessing the offloading circuitry. The method comprises providing 150 the access to the offloading circuitry for the one or more software applications via the selected driver at runtime.

In the following, the functionality of the apparatus 10, the device 10, the method and of a corresponding computer program is introduced in connection with the apparatus 10. Features introduced in connection with the apparatus 10 may be likewise included in the corresponding device 10, method and computer program.

Various examples of the present disclosure relate to an apparatus, device, method, and computer program that can be used to provide access to offloading circuitry for one or more software applications. In the present disclosure, a so-called "common interface" is provided to provide the access to the offloading circuitry. It is a "common" interface, as it provides the access to the offloading circuitry independent or regardless of the driver being used for accessing the offloading circuitry. Moreover, the instructions (i.e., requests) being used to access the common interface from the one or more software applications may be the same regardless of which driver is being used. The common interface provides a layer of abstraction between the one or more software applications and the drivers being used to access the offloading circuitry. For example, the common interface may be implemented as an application programming interface (API) and/or as a software library that can be accessed by the one or more software applications. As it can be used with both kernel space-space driver and user-space drivers, it resides in user space. In other words, the common interface may be provided (and accessed) in user-space. The one or more software applications may communicate with the common interface in user space, and the common interface may employ the selected driver (or drivers if both are used in parallel) to communicate with the offloading circuitry.

The proposed concept is used to provide access to offloading circuitry. In connection with FIGS. 2 to 4, an example is provided of a Data Streaming Accelerator (DSA), which is an example of data access offloading circuitry, i.e., circuitry that is used to offload processing related to the accessing of data. Another example from that type of offloading circuitry is offloading circuitry for implementing Direct Memory Access (DMA). However, the proposed concept is not limited to such data access offloading circuitry but may support any kind of offloading circuitry being accessed via user-space drivers and kernel-space drivers. For example, the offloading circuitry may be one of computation offloading circuitry (such as an accelerator card, a machine-learning coprocessor or digital signal processor), data access offloading circuitry and input/output access offloading circuitry (such as a networking coprocessor). In more general terms, the offloading circuitry may be circuitry for offloading an aspect of data processing or input/output processing from a general-purpose processing portion of a Central Processing Unit (CPU) of a computer system. In other words, the offloading circuitry may be used for offloading an aspect of data processing or input/output processing from a general-purpose processing portion of a Central Processing Unit (CPU) of a computer system. For example, the offloading circuitry may be included in a CPU of the computer system, e.g., in addition to the general-purpose processing portion of the CPU. For example, the CPU of the computer system may correspond to the processing circuitry 14.

For example, the common interface may be used by any application being executed on the computer system. For example, the one or more software applications may be executed using the processing circuitry, interface circuitry and/or storage circuitry of the apparatus 10. The common interface may be particularly useful for software applications that themselves provide a layer of abstraction, such as software containers or virtual machines. In other words, the one or more software applications may comprise at least one of a software container and a virtual machine. Any software application that is executed within such a software container or virtual machine might not be able to access the kernel-space driver directly, as it operates through the abstraction layer added by the software container or virtual machine. However, in general, the kernel-space driver may be useful in scenarios where multiple containers or virtual machines are executed concurrently, as the user-space driver may be limited to providing access to the offloading circuitry for a single application program. Therefore, the proposed concept may provide access to the offloading circuitry to software applications being executed within the software containers or virtual machines, without going through the extra level of abstraction provided by the software container or virtual machine.

The circuitry is configured to select one of the kernel-space driver and the user-space driver for accessing the offloading circuitry. As is evident from the naming, the kernel-space driver and the user-space driver are executed in different "spaces", i.e., the kernel space and the user space. In general, virtual memory of a computer system is segmented into kernel space and user space. The kernel space is reserved for running the kernel of the operating system being used to operate the computer system (along with kernel extensions and kernel-space drivers (short: kernel drivers), and the user space is used for running software applications and user-space drivers. Kernel-space drivers (or kernel drivers) operate in the kernel space, and the user-space drivers operate in the user space. In general, software operating within the kernel space have higher privileges on the CPU being used within the computer system, i.e., the software operates in so-called Ring-0, than software operating in user space, i.e., the software operates in co-called Ring-3 of the CPU. In general, when only a single application is used, both drivers may provide the same functionality. However, as synchronization between multiple instances of the user-space driver is hard to implement, the kernel-space driver may provide access to the offloading circuitry for multiple applications at the same time (in contrast to the user-space driver). In other words, the common interface may be configured to provide concurrent access for multiple software applications if the kernel-space driver is selected and to limit access to a single software application (per instance of offloading circuitry) if the user-space driver is selected.

While the present disclosure distinguishes between kernel space drivers and user space drivers, in various examples, even the user space driver may require a kernel space component. For example, the user space driver may be a driver that has an offloading circuitry-specific component that operates in user space (which is the user space driver referenced in the present context) and a generic component that operates in kernel space. For example, in the Linux operating system, the Virtual Function Input/Output (VFIO)

driver or Userspace I/O (UIO) driver may be used by the user space driver to access the offloading circuitry.

In various examples, the decision on which driver is to be selected is left to the user of the computer system, as the user is aware of the requirements of the software applications being executed on the computer system. For example, the circuitry may be configured to obtain an instruction related to the selection of the respective driver (with the instructions being issued by the user), and to select the driver according to the instruction. Accordingly, as shown in FIG. 1c, the method may comprise obtaining 120 the instruction related to the selection of the respective driver and selecting 130 the driver according to the instruction. For example, the instruction related to the selection of the respective driver may be obtained from a user via a management software application being executed on the computer system. For example, the circuitry may be configured to obtain the instruction related to the selection from the user via the common interface. For this purpose, the common interface may comprise a first application programming interface for managing the common interface. The circuitry may be configured to obtain the instruction related to the selection via the first application programming interface.

While, in connection with FIGS. 1a to 1d, a single offloading circuitry is referenced, the same principle may be applied to multiple instances of offloading circuitry. For example, of the computer system of CPU comprises multiple instances of the offloading circuitry, the selection of the driver may be performed separately for each instance. For example, for one or more instances, the user-space driver may be selected, and for one or more other instances, the kernel-space driver may be selected.

Once the selection is performed, e.g., based on the instruction related to the selection, the access to the offloading circuitry may be configured. For example, the circuitry may be configured to configure the access to the offloading circuitry based on the selected driver. Accordingly, as further shown in FIG. 1c, the method may comprise configuring 140 the access to the offloading circuitry based on the selected driver. For example, configuring the access to the offloading circuitry may comprise one or more of storing information on which driver to use for accessing the offloading circuitry, setting up one or more Working Queues (WQs) for the offloading circuitry, and allocating memory-mapped input/output (MMIO) mapped memory for accessing the offloading circuitry.

The circuitry is configured to provide the access to the offloading circuitry for the one or more software applications via the selected driver at runtime. The access is provided via the common interface. For the purposes of accessing the offloading circuitry, two separate APIs may be provided—the above-referenced first API for managing the common interface and/or the offloading circuitry, and a second API for the exchange of data for the offloaded processing. In other words, the circuitry may be configured to provide the common interface with at least one of a first API for managing the common interface and/or the offloading circuitry and a second API for exchanging data with the offloading circuitry. As outlined earlier, the first API may be used to manage the common interface and/or the offloading circuitry. For example, the first API may be used to select the driver, and to provide information on the MMIO mapped memory and/or the WQ to the one or more software applications.

The second API is then used to for actual access to the offloading circuitry. In other words, the circuitry may be configured to provide access to the offloading functionality of the offloading circuitry via the second API, e.g., by providing instructions to the offloading circuitry and receiving responses from the offloading circuitry. For example, as outlined above, the offloading circuitry may be accessed via one or more working queues of the offloading circuitry, with instructions being enqueued in the working queues. The second application programming interface may be configured to provide access to the one or more working queues of the offloading circuitry. While the access to the offloading circuitry may be provided via the working queues, this access may be abstracted by the common interface. Since the common interface operates in user space, memory mapping (in user space) may be used to provide the access to the one or more software applications. For example, the second application programming interface may be configured to provide access to the offloading circuitry via memory-mapped input/output managed by the respective driver. The one or more software applications may provide the instructions to the offloading circuitry by writing to the mapped memory, and to obtain the response via the mapped memory.

In general, the common interface aims at providing an abstraction layer for accessing the offloading circuitry regardless of which driver is being used. However, in many cases, the user-space driver and the kernel-space driver may provide their functionalities via different mechanisms. For example, the kernel space driver may employ system calls for configuration tasks, while the user space driver may use direct memory access via MMIO through an underlying kernel-space driver. Moreover, for the actual submission of input/output instructions (i.e., requests), different mechanisms may be used, depending on which driver is selected, and, in case of the kernel space driver, whether the kernel space driver is operated in dedicated mode (supporting a single application) or shared mode (supporting multiple applications). The common interface may be used to translate the instructions obtained from the one or more software applications into suitable instructions for the respective selected driver. In other words, the circuitry may be configured to translate instructions provided by the one or more software applications depending on the driver being selected. Accordingly, as further shown in FIG. 1c, the method may comprise translating 155 instructions provided by the one or more software applications depending on the driver being selected.

Figure 2:
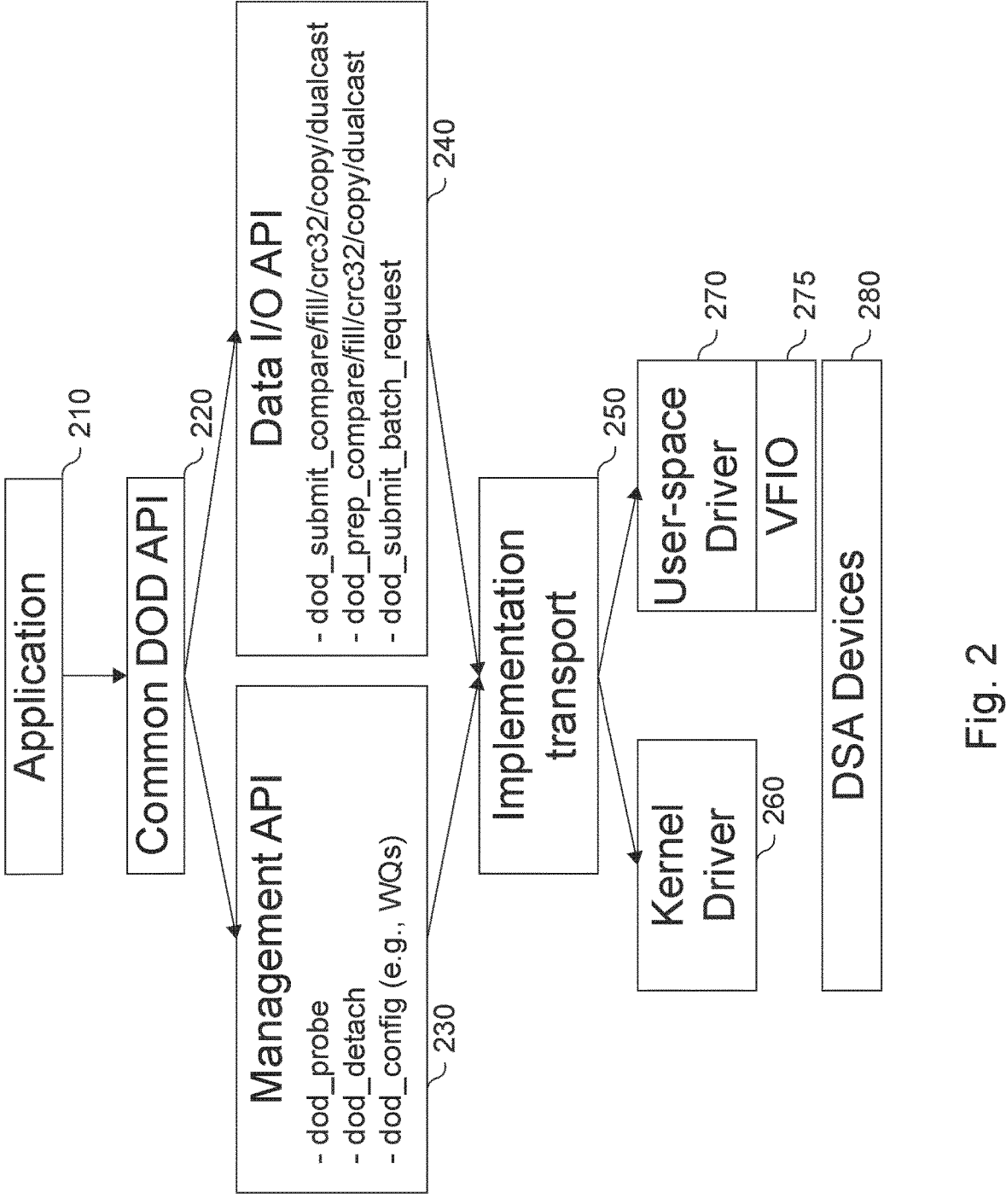
FIG. 2 shows a schematic diagram of an example architecture of the proposed concept.

In FIG. 3, some examples of such translations, or rather the differences between the instructions being used, are presented for the Data Streaming Accelerator example given in connection with FIGS. 2 to 4. For example, the circuitry may be configured to translate instructions related to management of the common interface and/or of the computation offloading device to instructions for accessing user-space-accessible memory associated with the user-space driver if the user-space driver is selected. In other words, the instructions related to management of the common interface and/or of the computation offloading device may be translated into instructions for accessing the user-space-accessible memory associated with the user-space driver if the user-space driver is selected. The translated instructions may then be used to access the user-space-accessible memory associated with the user-space driver. In case the kernel-space driver is selected, the circuitry may be configured to translate instructions related to management of the common interface and/or of the computation offloading device to system calls. In other words, the circuitry may be configured to issue system calls based on the instructions related to management of the common interface and/or of the computation offloading device.

Instructions related to data access may be translated as well. For example, depending on whether the kernel space driver or the user space driver is selected, and, if the kernel space driver is selected, depending on whether the kernel space driver is operated in dedicated mode or shared mode, the data input/output requests may be submitted as direct stores (if the user space driver or the kernel space driver in dedicated mode is used) or the data input/output requests be enqueued (if the kernel space driver is used in shared mode). For the input/output resource management, no translation may be required, or the same translation may be used for the kernel space driver and the user space driver, e.g., if the resource management is performed in user space.

The interface circuitry 12 or means for communicating 12 of FIG. 1a may correspond to one or more inputs and/or outputs for receiving and/or transmitting information, which may be in digital (bit) values according to a specified code, within a module, between modules or between modules of different entities. For example, the interface circuitry 12 or means for communicating 12 may comprise circuitry configured to receive and/or transmit information.

For example, the processing circuitry 14 or means for processing 14 of FIG. 1a may be implemented using one or more processing units, one or more processing devices, any means for processing, such as a processor, a computer or a programmable hardware component being operable with accordingly adapted software. In other words, the described function of the processing circuitry 14 or means for processing may as well be implemented in software, which is then executed on one or more programmable hardware components. Such hardware components may comprise a general purpose processor, a Digital Signal Processor (DSP), a micro-controller, etc.

For example, the storage circuitry 16 or means for storing information 16 of FIG. 1a may comprise at least one element of the group of a computer readable storage medium, such as a magnetic or optical storage medium, e.g. a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

More details and aspects of the apparatus 10, device 10, method, computer program, offloading circuitry 105 and computer system 100 are mentioned in connection with the proposed concept or one or more examples described above or below (e.g. FIGS. 1d to 4). The apparatus 10, device 10, method, computer program, offloading circuitry 105 and computer system 100 may comprise one or more additional optional features corresponding to one or more aspects of the proposed concept or one or more examples described above or below.

FIG. 1d shows a flow chart of an example of a method for setting up access to offloading circuitry in a computer system. This method may comprise a subset of the functionality of the method introduced in connection with FIGS. 1b and/or 1c. In particular, this method focuses on the configuration of the common interface and/or of the offloading circuitry for the purpose of accessing the offloading circuitry from the one or more application programs. Accordingly, the method of FIG. 1d may be implemented similar to the method introduced in connection with FIGS. 1b and/or 1c. The method comprises selecting 130 one of a kernel-space driver and a user-space driver for accessing the offloading circuitry. The method comprises configuring 140 the access to the offloading circuitry based on the selected driver. The method comprises providing 150 access to the offloading circuitry via a common interface, with the common interface being used to access the offloading circuitry via the selected driver.

Examples of the present disclosure further provide a computer system, such as the computer system 100 shown in FIG. 1*a*, comprising circuitry or means that is/are configured to execute the method of FIG. 1*d*. For example, the computer system may comprise the apparatus 10 or device 10 introduced in connection with FIG. 1*a*, with the apparatus or device being configured to execute the method.

More details and aspects of the method, apparatus 10, device 10, computer program, offloading circuitry 105 and computer system 100 are mentioned in connection with the proposed concept or one or more examples described above or below (e.g. FIG. 1*a* to 1*c*, 2 to 4). The method, apparatus 10, device 10, computer program, offloading circuitry 105 and computer system 100 may comprise one or more additional optional features corresponding to one or more aspects of the proposed concept or one or more examples described above or below.

Various examples of the present disclosure relate to a method and apparatus for uniformly driving CPU offloading devices via kernel/user space drivers in one software stack.

As outlined above, many systems comprising hardware offloading devices lack functionality to drive hardware offloading devices (such as the DSA device) via both kernel and user space drivers in one software library or stack. In general, the kernel driver and user space driver are being used separately. If a less recent kernel is installed on the platform with new hardware offloading devices (e.g., DSA devices), the driver might have to be back-ported into the less recent kernel or the kernel has to be upgraded if the kernel driver is to be used.

This results in a lack of flexibility. Users or applications might only use single-user driver mode, which is not suitable to many usage scenarios. To overcome this, the provided library or API might only be used in a specific operating system with a required kernel version.

Also, to support both the user space driver and the kernel space driver, additional engineering work is required, increasing the effort required by customers. Using the DSA device as an example, if users want to have a chained crc32c (a cyclic redundancy check for 32-bit values) support, they may need to implement it twice, i.e., once on the kernel DSA driver and once on the user space driver separately. In other words, no common usage API or framework to drive the devices by two driver solutions in one software stack is generally available.

The proposed concept provides a uniform software stack which can be used to drive hardware based offloading devices (such as the DSA device) via a kernel space or user space driver. The proposed approach can be naturally extended into driving other hardware-based CPU offloading devices such as a DMA (Direct Memory Access) engine that can perform operations including but not limited to copy, fill, CRC (Cyclic Redundancy Check), etc. For example, some hardware vendors may equip the offloading DMA engine with features that are similar to the features provided by DSA.

The proposed concept is based on the finding, that a new design methodology can be used to drive the hardware based offloading devices via both kernel mode and user space mode. In this proposed concept, the methodology is described on DSA devices as a reference to illustrate the usability of the proposed approach. With the proposed concept, users may have the flexibility to choose which driver to use in one software stack. To achieve that, the proposed design hides the driver implementation details or the kernel or user space. Moreover, the common operations in management and data I/O path may be abstracted.

It is evident that the proposed concept can be used to generically cover other CPU offloading devices' usage if such device(s) can be driven by kernel or user space drivers.

Using DSA devices as an example, users can use the proposed software stack to easily use the DSA feature provided with some Intel® processors on different Linux versions. Thus, it will avoid efforts required by the user to develop a wrapper library. Moreover, the common code can be reused with consolidated APIs (Application Programming Interfaces). Compared with the approach of separately using user space drivers and kernel space drivers, it may be simpler for customers to manage and configure. Using the complicated "chained crc32c" as an example, the complexity can be implemented just once rather than twice (once for kernel, once for user space driver) in the proposed API.

The proposed concept provides a methodology for driving CPU based offloading devices via kernel space or user space drivers in one software stack with a hybrid mode. To make it clearly to be understood, Intel®'s DSA device usage is used as a point of reference. The proposed approach improves the flexibility to leverage the DSA devices while using less recent or more recent kernels.

FIG. 2 shows a schematic diagram of an example architecture of the proposed concept. FIG. 2 may show the architecture of the hybrid DOD one stack API (which may correspond to the common interface introduced in connection with FIGS. 1*a* to 1*d*). An application 210 is directly talking with the proposed common DOD API 220 in the user space. The proposed hybrid API can be divided into two parts. A first part is the Management API 230 (e.g., the first API). This API is used to manage the underlying DSA devices. It may use kernel driver or user space driver to drive the devices. It may include the device probe, detach, configuration and other related functions. A second part is the Data I/O (Input/Output) API 240 (e.g., the second API). This API provides the Data related operation on the allocated working queues (WQs) on the underlying DSA devices. For example, single request submission functions, i.e., DOD-_submit_compare/fill/crc32c/copy/dualcast (and the corresponding DOD_prep_*) may be supported. Moreover, batched mode may be supported. In the proposed API, (all of) the requests may be maintained in the user space. Here, the abstraction may be provided. When requests are submitted to the devices, the Data I/O API may access the MMIO (Memory-Mapped Input/Output) mapped memory managed by the underlying kernel device driver or the user space drivers. The API may invoke the right drivers conduct the data I/O operations.

Both parts of the API connect to implementation transport 250. This transport function may be used to provide the APIs for each detailed implementation (kernel or user space). The user space drivers may use VFIO (Virtual Function Input/Output, or similar functionality) to memory map the device in the user space accessible memory. For the kernel part, system calls (e.g., ioctl) may be used to access and configure the DSA devices or WQs in the kernel space.

The implementation transport 250 connects to the kernel driver 260 and user space driver 270 (which is combined with the VFIO 275). The existing kernel driver 260 and user space drivers 275 for the DSA devices 280 may be reused.

FIG. 3 shows an example of a table illustrating a difference in resource management and access with different drivers. The table shows the difference between kernel and user space driver to manage and access the DSA devices. As stated, the common logic and interface may be extracted and included in the common library (management and Data I/O API) and the unique operations may be put into the transport parts (kernel or user space). For example, for DSA device register and PCI (Peripheral Component Interconnect) bar space access, the kernel driver may use a system call and the user space driver may use direct memory access via memory-mapped I/O through VFIO. For DSA WQ and group configuration, the kernel driver may use a system call and the user space driver may use direct memory access via memory-mapped I/O through VFIO. For different I/O requests resource management, no difference may be between using the kernel or user space driver. It may be uniformly managed in the user space. For I/O request submission, in kernel mode, two different modes are differentiated—dedicated mode and shared mode. In dedicated mode, movdir64b (move 64 bytes as direct store) is leveraged to operate on the register of the WQ provided by the kernel with the hardware descriptor. In shared mode, enqcmd (enqueue command) is used to the registers of the WQ provided by the kernel with the hardware descriptor. In user mode, movdir64b (move 64 bytes as direct store) is leveraged to operate on the register of the WQ provided by the kernel with the DOD hardware descriptor.

With the proposed approach, applications may configure the mode to manage the underlying devices. For example, if there are four DSA devices on a platform as shown in the following, the users can use the library to configure the first two devices managed by the kernel drivers (via kernel space DOD driver), and the third and fourth ones by user space drivers. Then when the applications launch, it can use the hybrid library to access the 4 devices simultaneously, providing flexible access to the DSA devices. For example, the four DSA devices may be enumerated as 0000:00:0a.0 (8086 0b25), 0000:00:0a.1 (8086 0b25) 0000:00:0b.0 (8086 0b25) and 0000:00:0b.1 (8086 0b25). The first two may be managed by kernel DOD drivers, and the latter two may be managed by user space DOD drivers, such that the DSA devices are driven via different drivers in one software stack. To make the software convenient to use, a methodology may be provided to switch the driver mode for each device. For example, VFIO may be used to manage 0000:00:0a.0 DSA device, then it can be switched back to the kernel driver later.

FIG. 4 shows an example of a typical usage flow of an application with the proposed hybrid API, which can be divided into 5 tasks: In a first task 410, the user chooses how to configure and use the underly DSA drivers. It may include two parts, i.e., (1) Using which driver to drive which devices, and (2) How to configure the resources on the chosen device. In a second task 420, the software executes the requirements from the users, i.e., (1) Use the designated driver (kernel or user space) to bind the chosen DSA devices; (2) Configure the WQs (working queues) and other related resources associated on the chosen DSA device. In a third task 430, the application uses the common management API, e.g., as described in connection with FIG. 2, to probe and manage the configured devices. The application does not need know which drivers are used to perform the work. In a fourth task 440, the application uses the common data I/O API to offload the requests to the underlying DSA devices. The application does not need to know which drivers are used to perform the work. In a fifth task 450, before the application exits, the applications may leverage the common management APIs to detach the DSA devices and destruct the resources allocated on the DSA device via the corresponding driver.

In any case where (different) hardware based offloading devices can be driven by kernel or user mode drivers, the proposed concept may be application. In each of these cases, the usage may be divided into a management part and an I/O part, and the common part may be abstracted. The proposed concept was implemented in a proof of concept and tested on hardware offloading devices in a simulator, providing good results.

In the proposed concept, a hybrid software stack is provided which can be used to drive hardware based offloading devices (especially on DSA devices as a reference) through kernel or user space driver together. A uniform way to manage and access the DSA devices is illustrated with detailed information. It may provide the flexibility for applications (users) to use. With the proposed approach, the adoption of hardware offloading devices may be accelerated when the hardware is shipped to the market. Moreover, the proposed hybrid software stack for DSA devices usage can be easily adapted into the cloud native usage model. Apart from DSA devices, it may be adapted to other offloading devices (i.e., offloading circuitry) as well.

More details and aspects of the hybrid API are mentioned in connection with the proposed concept or one or more examples described above or below (e.g. FIG. 1a to 1d). The hybrid API may comprise one or more additional optional features corresponding to one or more aspects of the proposed concept or one or more examples described above or below.

The aspects and features described in relation to a particular one of the previous examples may also be combined with one or more of the further examples to replace an identical or similar feature of that further example or to additionally introduce the features into the further example.

In the following, some examples are presented:

An example (e.g., example 1) relates to an apparatus (10) for a computer system (100), the apparatus comprising circuitry (12; 14; 16) configured to provide a common interface for accessing offloading circuitry (105) of the computer system from one or more software applications. The circuitry is configured to select one of a kernel-space driver and a user-space driver for accessing the offloading circuitry. The circuitry is configured to provide the access to the offloading circuitry for the one or more software applications via the selected driver at runtime.

Another example (e.g., example 2) relates to a previously described example (e.g., example 1) or to any of the examples described herein, further comprising that the circuitry is configured to obtain an instruction related to the selection of the respective driver, and to select the driver according to the instruction.

Another example (e.g., example 3) relates to a previously described example (e.g., example 2) or to any of the examples described herein, further comprising that the circuitry is configured to obtain the instruction related to the selection of the respective driver from a user via a management software application being executed on the computer system.

Another example (e.g., example 4) relates to a previously described example (e.g., one of the examples 1 to 3) or to any of the examples described herein, further comprising that the circuitry is configured to configure the access to the offloading circuitry based on the selected driver.

Another example (e.g., example 5) relates to a previously described example (e.g., one of the examples 1 to 4) or to any of the examples described herein, further comprising that the circuitry is configured to provide the common interface with at least one of a first application programming interface for managing the common interface and/or the offloading circuitry and a second application programming interface for exchanging data with the offloading circuitry.

Another example (e.g., example 6) relates to a previously described example (e.g., example 5) or to any of the examples described herein, further comprising that the second application programming interface is configured to provide access to one or more working queues of the offloading circuitry.

Another example (e.g., example 7) relates to a previously described example (e.g., one of the examples 5 to 6) or to any of the examples described herein, further comprising that the second application programming interface is configured to provide access to the offloading circuitry via memory-mapped input/output managed by the respective driver.

Another example (e.g., example 8) relates to a previously described example (e.g., one of the examples 1 to 7) or to any of the examples described herein, further comprising that the circuitry is configured to translate instructions provided by the one or more software applications depending on the driver being selected.

Another example (e.g., example 9) relates to a previously described example (e.g., example 8) or to any of the examples described herein, further comprising that the circuitry is configured to translate instructions related to management of the common interface and/or of the computation offloading device to instructions for accessing user-space-accessible memory associated with the user-space driver if the user-space driver is selected.

Another example (e.g., example 10) relates to a previously described example (e.g., one of the examples 8 to 9) or to any of the examples described herein, further comprising that the circuitry is configured to translate instructions related to management of the common interface and/or of the computation offloading device to system calls if the kernel-space driver is selected.

Another example (e.g., example 11) relates to a previously described example (e.g., one of the examples 1 to 10) or to any of the examples described herein, further comprising that the common interface is provided in user-space.

Another example (e.g., example 12) relates to a previously described example (e.g., one of the examples 1 to 11) or to any of the examples described herein, further comprising that the common interface is configured to provide concurrent access for multiple software applications if the kernel-space driver is selected and to limit access to a single software application if the user-space driver is selected.

Another example (e.g., example 13) relates to a previously described example (e.g., one of the examples 1 to 12) or to any of the examples described herein, further comprising that the one or more software applications comprise at least one of a software container and a virtual machine.

Another example (e.g., example 14) relates to a previously described example (e.g., one of the examples 1 to 13) or to any of the examples described herein, further comprising that the offloading circuitry is included in a central processing unit of the computer system.

Another example (e.g., example 15) relates to a previously described example (e.g., one of the examples 1 to 14) or to any of the examples described herein, further comprising that the offloading circuitry is one of computation offloading circuitry, data access offloading circuitry and input/output access offloading circuitry.

An example (e.g., example 16) relates to a computer system (100) comprising the apparatus (10) according to one of the previous examples (e.g., one of the examples 1 to 15) and the offloading circuitry (105).

An example (e.g., example 17) relates to a device (10) for a computer system (100), the device comprising means (12; 14;16) configured to provide a common interface for accessing offloading circuitry (105) of the computer system from one or more software applications. The means is/are configured to select one of a kernel-space driver and a user-space driver for accessing the offloading circuitry. The means is/are configured to provide the access to the offloading circuitry for the one or more software applications via the selected driver at runtime.

Another example (e.g., example 18) relates to a previously described example (e.g., example 17) or to any of the examples described herein, further comprising that the means is configured to obtain an instruction related to the selection of the respective driver, and to select the driver according to the instruction.

Another example (e.g., example 19) relates to a previously described example (e.g., example 18) or to any of the examples described herein, further comprising that the means is configured to obtain the instruction related to the selection of the respective driver from a user via a management software application being executed on the computer system.

Another example (e.g., example 20) relates to a previously described example (e.g., one of the examples 17 to 19) or to any of the examples described herein, further comprising that the means is configured to configure the access to the offloading circuitry based on the selected driver.

Another example (e.g., example 21) relates to a previously described example (e.g., one of the examples 17 to 20) or to any of the examples described herein, further comprising that the means is configured to provide the common interface with at least one of a first application programming interface for managing the common interface and/or the offloading circuitry and a second application programming interface for exchanging data with the offloading circuitry.

Another example (e.g., example 22) relates to a previously described example (e.g., example 5) or to any of the examples described herein, further comprising that the second application programming interface is configured to provide access to one or more working queues of the offloading circuitry.

Another example (e.g., example 23) relates to a previously described example (e.g., one of the examples 21 to 22) or to any of the examples described herein, further comprising that the second application programming interface is configured to provide access to the offloading circuitry via memory-mapped input/output managed by the respective driver.

Another example (e.g., example 24) relates to a previously described example (e.g., one of the examples 17 to 23) or to any of the examples described herein, further comprising that the means is configured to translate instructions provided by the one or more software applications depending on the driver being selected.

Another example (e.g., example 25) relates to a previously described example (e.g., example 24) or to any of the examples described herein, further comprising that the means is configured to translate instructions related to management of the common interface and/or of the computation offloading device to instructions for accessing user-space-accessible memory associated with the user-space driver if the user-space driver is selected.

Another example (e.g., example 26) relates to a previously described example (e.g., one of the examples 24 to 25)

or to any of the examples described herein, further comprising that the means is configured to translate instructions related to management of the common interface and/or of the computation offloading device to system calls if the kernel-space driver is selected.

Another example (e.g., example 27) relates to a previously described example (e.g., one of the examples 17 to 26) or to any of the examples described herein, further comprising that the common interface is provided in user-space.

Another example (e.g., example 28) relates to a previously described example (e.g., one of the examples 17 to 27) or to any of the examples described herein, further comprising that the common interface is configured to provide concurrent access for multiple software applications if the kernel-space driver is selected and to limit access to a single software application if the user-space driver is selected.

Another example (e.g., example 29) relates to a previously described example (e.g., one of the examples 17 to 28) or to any of the examples described herein, further comprising that the one or more software applications comprise at least one of a software container and a virtual machine.

Another example (e.g., example 30) relates to a previously described example (e.g., one of the examples 17 to 29) or to any of the examples described herein, further comprising that the offloading circuitry is included in a central processing unit of the computer system.

Another example (e.g., example 31) relates to a previously described example (e.g., one of the examples 17 to 30) or to any of the examples described herein, further comprising that the offloading circuitry is one of computation offloading circuitry, data access offloading circuitry and input/output access offloading circuitry.

An example (e.g., example 32) relates to a computer system (100) comprising the device (10) according to one of the previous examples (e.g., according to one of the examples 17 to 31) and the offloading circuitry (105).

An example (e.g., example 33) relates to a method for a computer system (100), the method comprising providing (110) a common interface for accessing offloading circuitry (105) of the computer system from one or more software applications. The method comprises selecting (130) one of a kernel-space driver and a user-space driver for accessing the offloading circuitry. The method comprises providing (150) the access to the offloading circuitry for the one or more software applications via the selected driver at runtime.

Another example (e.g., example 34) relates to a previously described example (e.g., example 33) or to any of the examples described herein, further comprising that the method comprises obtaining (120) an instruction related to the selection of the respective driver and selecting (130) the driver according to the instruction.

Another example (e.g., example 35) relates to a previously described example (e.g., example 34) or to any of the examples described herein, further comprising that the method comprises obtaining (120) the instruction related to the selection of the respective driver from a user via a management software application being executed on the computer system.

Another example (e.g., example 36) relates to a previously described example (e.g., one of the examples 33 to 35) or to any of the examples described herein, further comprising that the method comprises configuring (140) the access to the offloading circuitry based on the selected driver.

Another example (e.g., example 37) relates to a previously described example (e.g., one of the examples 33 to 36) or to any of the examples described herein, further comprising that the method comprises providing (110) the common interface with at least one of a first application programming interface for managing the common interface and/or the offloading circuitry and a second application programming interface for exchanging data with the offloading circuitry.

Another example (e.g., example 38) relates to a previously described example (e.g., example 37) or to any of the examples described herein, further comprising that the second application programming interface provides access to one or more working queues of the offloading circuitry.

Another example (e.g., example 39) relates to a previously described example (e.g., one of the examples 37 to 38) or to any of the examples described herein, further comprising that the second application programming interface provides access to the offloading circuitry via memory-mapped input/output managed by the respective driver.

Another example (e.g., example 40) relates to a previously described example (e.g., one of the examples 33 to 39) or to any of the examples described herein, further comprising that the method comprises translating (155) instructions provided by the one or more software applications depending on the driver being selected.

Another example (e.g., example 41) relates to a previously described example (e.g., example 40) or to any of the examples described herein, further comprising that the method comprises translating (155) instructions related to management of the common interface and/or of the computation offloading device to instructions for accessing user-space-accessible memory associated with the user-space driver if the user-space driver is selected.

Another example (e.g., example 42) relates to a previously described example (e.g., one of the examples 40 to 41) or to any of the examples described herein, further comprising that the method comprises translating (155) instructions related to management of the common interface and/or of the computation offloading device to system calls if the kernel-space driver is selected.

Another example (e.g., example 43) relates to a previously described example (e.g., one of the examples 33 to 42) or to any of the examples described herein, further comprising that the common interface is provided in user-space.

Another example (e.g., example 44) relates to a previously described example (e.g., one of the examples 33 to 43) or to any of the examples described herein, further comprising that the common interface provides concurrent access for multiple software applications if the kernel-space driver is selected and limits access to a single software application if the user-space driver is selected.

Another example (e.g., example 45) relates to a previously described example (e.g., one of the examples 33 to 44) or to any of the examples described herein, further comprising that the one or more software applications comprise at least one of a software container and a virtual machine.

Another example (e.g., example 46) relates to a previously described example (e.g., one of the examples 33 to 45) or to any of the examples described herein, further comprising that the offloading circuitry is included in a central processing unit of the computer system.

Another example (e.g., example 47) relates to a previously described example (e.g., one of the examples 33 to 46) or to any of the examples described herein, further comprising that the offloading circuitry is one of computation offloading circuitry, data access offloading circuitry and input/output access offloading circuitry.

An example (e.g., example 48) relates to a computer system (100) being configured to perform the method according to one of the previous examples (e.g., one of the examples 33 to 47).

An example (e.g., example 49) relates to a method for setting up access to offloading circuitry (105) in a computer system (100), the method comprising selecting (130) one of a kernel-space driver and a user-space driver for accessing the offloading circuitry. The method comprises configuring (140) the access to the offloading circuitry based on the selected driver. The method comprises providing (150) access to the offloading circuitry via a common interface, with the common interface being used to access the offloading circuitry via the selected driver.

An example (e.g., example 50) relates to a computer system (100) comprising circuitry (12; 14; 16) configured to execute the method according to a previous example (e.g., example 49).

Another example (e.g., example 51) relates to a previously described example (e.g., example 50) or to any of the examples described herein, further comprising that the computer system comprises the apparatus (10) according to one of the previous examples (e.g., one of the examples 1 to 15), with the apparatus (10) being configured to execute the method to one of the previous examples (e.g., according to example 49).

An example (e.g., example 52) relates to a computer system (100) comprising means (12; 14; 16) configured to execute the method according to a previous examples (e.g., example 49).

Another example (e.g., example 53) relates to a previously described example (e.g., example 52) or to any of the examples described herein, further comprising that the computer system comprises the device (10) according to one of the previous examples (e.g., one of the examples 17 to 31), with the device (10) being configured to execute the method to one of the previous examples (e.g., according to example 49).

An example (e.g., example 54) relates to a machine-readable storage medium including program code, when executed, to cause a machine to perform the method of one of the examples 33 to 47 or the method according to one of the examples 49 to 50.

An example (e.g., example 55) relates to a computer program having a program code for performing the method of one of the examples 33 to 47 or the method according to one of the examples 49 to 50 when the computer program is executed on a computer, a processor, or a programmable hardware component.

An example (e.g., example 56) relates to a machine-readable storage including machine readable instructions, when executed, to implement a method or realize an apparatus as claimed in any pending claim or shown in any example.

Examples may further be or relate to a (computer) program including a program code to execute one or more of the above methods when the program is executed on a computer, processor, or other programmable hardware component. Thus, steps, operations, or processes of different ones of the methods described above may also be executed by programmed computers, processors, or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) pro-grammable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations, or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

As used herein, the term "module" refers to logic that may be implemented in a hardware component or device, software or firmware running on a processing unit, or a combination thereof, to perform one or more operations consistent with the present disclosure. Software and firmware may be embodied as instructions and/or data stored on non-transitory computer-readable storage media. As used herein, the term "circuitry" can comprise, singly or in any combination, non-programmable (hardwired) circuitry, programmable circuitry such as processing units, state machine circuitry, and/or firmware that stores instructions executable by programmable circuitry. Modules described herein may, collectively or individually, be embodied as circuitry that forms a part of a computing system. Thus, any of the modules can be implemented as circuitry. A computing system referred to as being programmed to perform a method can be programmed to perform the method via software, hardware, firmware, or combinations thereof.

Any of the disclosed methods (or a portion thereof) can be implemented as computer-executable instructions or a computer program product. Such instructions can cause a computing system or one or more processing units capable of executing computer-executable instructions to perform any of the disclosed methods. As used herein, the term "computer" refers to any computing system or device described or mentioned herein. Thus, the term "computer-executable instruction" refers to instructions that can be executed by any computing system or device described or mentioned herein.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, C#, assembly language, or any other programming language. Likewise, the disclosed technologies are not limited to any particular computer system or type of hardware.

Furthermore, any of the software-based examples (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electro-magnetic communications (including RF, microwave, ultrasonic, and infrared communications), electronic communications, or other such communication means.

The disclosed methods, apparatuses, and systems are not to be construed as limiting in any way. Instead, the present disclosure is directed toward all novel and nonobvious features and aspects of the various disclosed examples, alone and in various combinations and subcombinations with one another. The disclosed methods, apparatuses, and systems are not limited to any specific aspect or feature or combination thereof, nor do the disclosed examples require that any one or more specific advantages be present or problems be solved.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The invention claimed is:

1. An apparatus for a computer system, the apparatus comprising interface circuitry and processing circuitry to:
    provide a common interface for accessing offloading circuitry of the computer system from one or more software applications;
    select one of a kernel-space driver and a user-space driver for accessing the offloading circuitry; and
    provide the access to the offloading circuitry for the one or more software applications via the selected driver at runtime.

2. The apparatus according to claim 1, wherein the processing circuitry is to obtain an instruction related to the selection of the respective driver, and to select the driver according to the instruction.

3. The apparatus according to claim 2, wherein the processing circuitry is to obtain the instruction related to the selection of the respective driver from a user via a management software application being executed on the computer system.

4. The apparatus according to claim 1, wherein the processing circuitry is to configure the access to the offloading circuitry based on the selected driver.

5. The apparatus according to claim 1, wherein the processing circuitry is to provide the common interface with at least one of a first application programming interface for managing the common interface and/or the offloading circuitry and a second application programming interface for exchanging data with the offloading circuitry.

6. The apparatus according to claim 5, wherein the second application programming interface is configured to provide access to one or more working queues of the offloading circuitry.

7. The apparatus according to claim 5, wherein the second application programming interface is configured to provide access to the offloading circuitry via memory-mapped input/output managed by the respective driver.

8. The apparatus according to claim 1, wherein the processing circuitry is to translate instructions provided by the one or more software applications depending on the driver being selected.

9. The apparatus according to claim 8, wherein the processing circuitry is to translate instructions related to management of the common interface and/or of the computation offloading device to instructions for accessing user-space-accessible memory associated with the user-space driver if the user-space driver is selected.

10. The apparatus according to claim 8, wherein the processing circuitry is to translate instructions related to management of the common interface and/or of the computation offloading device to system calls if the kernel-space driver is selected.

11. The apparatus according to claim 1, wherein the common interface is provided in user-space.

12. The apparatus according to claim 1, wherein the common interface is configured to provide concurrent access for multiple software applications if the kernel-space driver is selected and to limit access to a single software application if the user-space driver is selected.

13. The apparatus according to claim 1, wherein the one or more software applications comprise at least one of a software container and a virtual machine.

14. The apparatus according to claim 1, wherein the offloading circuitry is included in a central processing unit of the computer system.

15. The apparatus according to claim 1, wherein the offloading circuitry is one of computation offloading circuitry, data access offloading circuitry and input/output access offloading circuitry.

16. A computer system comprising the apparatus according to claim 1 and the offloading circuitry.

17. A method for a computer system, the method comprising:
    providing a common interface for accessing offloading circuitry of the computer system from one or more software applications;
    selecting one of a kernel-space driver and a user-space driver for accessing the offloading circuitry; and
    providing the access to the offloading circuitry for the one or more software applications via the selected driver at runtime.

18. A machine-readable storage medium including program code, when executed, to cause a machine to perform the method according to claim 17.

19. A method for setting up access to offloading circuitry in a computer system, the method comprising:

selecting one of a kernel-space driver and a user-space driver for accessing the offloading circuitry;

configuring the access to the offloading circuitry based on the selected driver;

providing access to the offloading circuitry via a common interface, with the common interface being used to access the offloading circuitry via the selected driver.

20. A machine-readable storage medium including program code, when executed, to cause a machine to perform the method according to claim 19.

* * * * *